(12) United States Patent
Lin (10) Patent No.: US 12,158,227 B2
(45) Date of Patent: Dec. 3, 2024

(54) FLOW CONTROL STRUCTURE OF WATER HOSE JOINT

(71) Applicant: Yu-Ting Lin, Taichung (TW)

(72) Inventor: Yu-Ting Lin, Taichung (TW)

( * ) Notice: Subject to any disclaimer, the term of this patent is extended or adjusted under 35 U.S.C. 154(b) by 0 days.

(21) Appl. No.: 18/124,478

(22) Filed: Mar. 21, 2023

(65) Prior Publication Data

US 2024/0318753 A1    Sep. 26, 2024

(51) Int. Cl.
*F16L 29/00* (2006.01)
*F16L 19/02* (2006.01)
*F16L 37/46* (2006.01)

(52) U.S. Cl.
CPC ......... *F16L 29/007* (2013.01); *F16L 19/0218* (2013.01); *F16L 19/0237* (2013.01); *F16L 37/46* (2013.01)

(58) Field of Classification Search
CPC . F16L 29/007; F16L 19/0218; F16L 19/0237; F16L 37/46; F16K 31/445; F16K 3/265; F16K 3/26
USPC ................. 251/148, 346, 343–345
See application file for complete search history.

(56) References Cited

U.S. PATENT DOCUMENTS

| | | | | |
|---|---|---|---|---|
| 486,722 A | * | 11/1892 | Loss | F16K 47/08 137/625.33 |
| 970,225 A | * | 9/1910 | Holden | F16K 21/04 251/344 |
| 1,850,879 A | * | 3/1932 | Hunt | F16K 3/265 251/149.9 |
| 2,509,671 A | * | 5/1950 | Christensen | F16K 11/0712 251/324 |
| 2,760,754 A | * | 8/1956 | Gladstone | A01G 25/16 251/344 |
| 2,764,452 A | * | 9/1956 | Anderson | B05B 7/26 210/429 |
| 3,106,378 A | * | 10/1963 | Hellstern | F16L 37/23 251/344 |
| 3,106,379 A | * | 10/1963 | Sciuto | F16L 37/46 251/344 |
| 3,127,149 A | * | 3/1964 | Cruse | F16L 37/46 251/344 |
| 3,140,072 A | * | 7/1964 | Sciuto, Jr. | F16L 37/46 74/41 |
| 3,404,705 A | * | 10/1968 | Zopf | F16L 37/23 137/625.25 |
| 3,425,664 A | * | 2/1969 | Niskin | F16K 3/265 251/344 |
| 3,477,688 A | * | 11/1969 | Cruse | F16L 37/23 251/149.9 |

(Continued)

FOREIGN PATENT DOCUMENTS

| | | | | |
|---|---|---|---|---|
| DE | 897499 C | * | 11/1953 | |
| FR | 1343440 A | * | 1/1963 | |
| FR | 2993337 A1 | * | 1/2014 | ............. F16K 1/123 |

*Primary Examiner* — David Colon-Morales (57) ABSTRACT

A flow control structure of a water hose joint has: a hose connector, a coupler, a control section, and a hose. The coupler is coupled with the hose connector, the control section is sleeved on the coupler, and the coupler is inserted into the hose, so as to complete a flow control structure of the hose connector. By combining the hose connector with a connecting pipe and rotating the control section to adjust the relative position of the control section and the coupler to change the water flow, which has the effect of simple flow adjustment.

11 Claims, 7 Drawing Sheets

(56) References Cited

U.S. PATENT DOCUMENTS

| | | | | | |
|---|---|---|---|---|---|
| 3,589,673 | A | * | 6/1971 | Cruse | F16L 37/23 251/149.1 |
| 3,627,262 | A | * | 12/1971 | Hottle | F16K 31/445 251/346 |
| 3,640,465 | A | * | 2/1972 | Hicks | F16L 29/007 239/586 |
| 3,642,249 | A | * | 2/1972 | Cruse | F16K 3/26 251/344 |
| 4,494,728 | A | * | 1/1985 | Cruse | F16L 37/46 408/223 |
| 4,765,657 | A | * | 8/1988 | Cruse | F16L 37/23 285/91 |
| 5,161,568 | A | * | 11/1992 | Turvey | F16L 37/12 251/96 |
| 5,451,031 | A | * | 9/1995 | Purvis | F16L 37/23 285/38 |
| 5,967,491 | A | * | 10/1999 | Magnuson | F16L 37/23 251/149.6 |
| 11,149,886 | B1 | * | 10/2021 | Edler | F16L 37/46 |

\* cited by examiner

FLOW CONTROL STRUCTURE OF WATER HOSE JOINT

BACKGROUND OF THE INVENTION

Field of the Invention

The present invention relates to a flow control structure of water hose joint.

Description of the Related Art

Usually, in order to wash outdoor objects, flushing tools are often used, such as spraying heads and car washing guns. The known flushing tools are externally connected to a hose from a faucet, and the hose is connected to a joint, and then the joint is connected to the flushing tools to complete assembly.

However, when using conventional flushing tools, because the faucet is a certain distance away from the flushing utensils, if the water volume needs to be adjusted during use, it may be necessary to walk back a certain distance, and if the distance is too long, it can cause inconvenience to a certain extent for the user. Therefore, it will be more convenient for the user to use the flushing tools if the outlet flow can be adjusted not through the tap but through the joint installed on the flushing tools.

Therefore, it is desirable to provide a flow control structure of a water hose joint to mitigate and/or obviate the aforementioned problems.

SUMMARY OF THE INVENTION

An objective of various embodiments of the present invention is to provide a flow control structure of a water hose joint which is capable of improving the above-mention problems.

In order to achieve the above mentioned objective, a flow control structure of a water hose joint has: a hose connector, a coupler, a control section, and a hose. The coupler is coupled with the hose connector, the control section is sleeved on the coupler, and the coupler is inserted into the hose, so as to complete a flow control structure of the hose connector. By combining the hose connector with a connecting pipe, rotating the control section to adjust the relative position of the control section and the coupler changes the water flow, which has the effect of simple flow adjustment.

Other objects, advantages, and novel features of invention will become more apparent from the following detailed description when taken in conjunction with the accompanying drawings.

DETAILED DESCRIPTION OF THE PREFERRED EMBODIMENT

Figure 1:
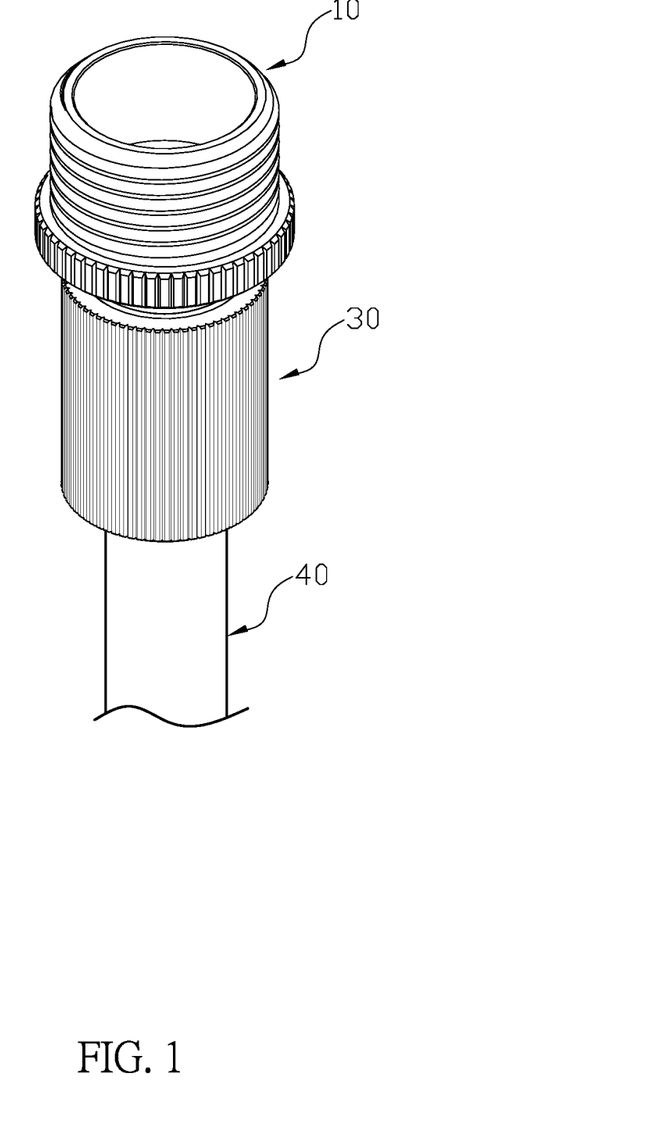
FIG. 1 is a perspective drawing of a preferred embodiment of the present invention.
Figure 2:
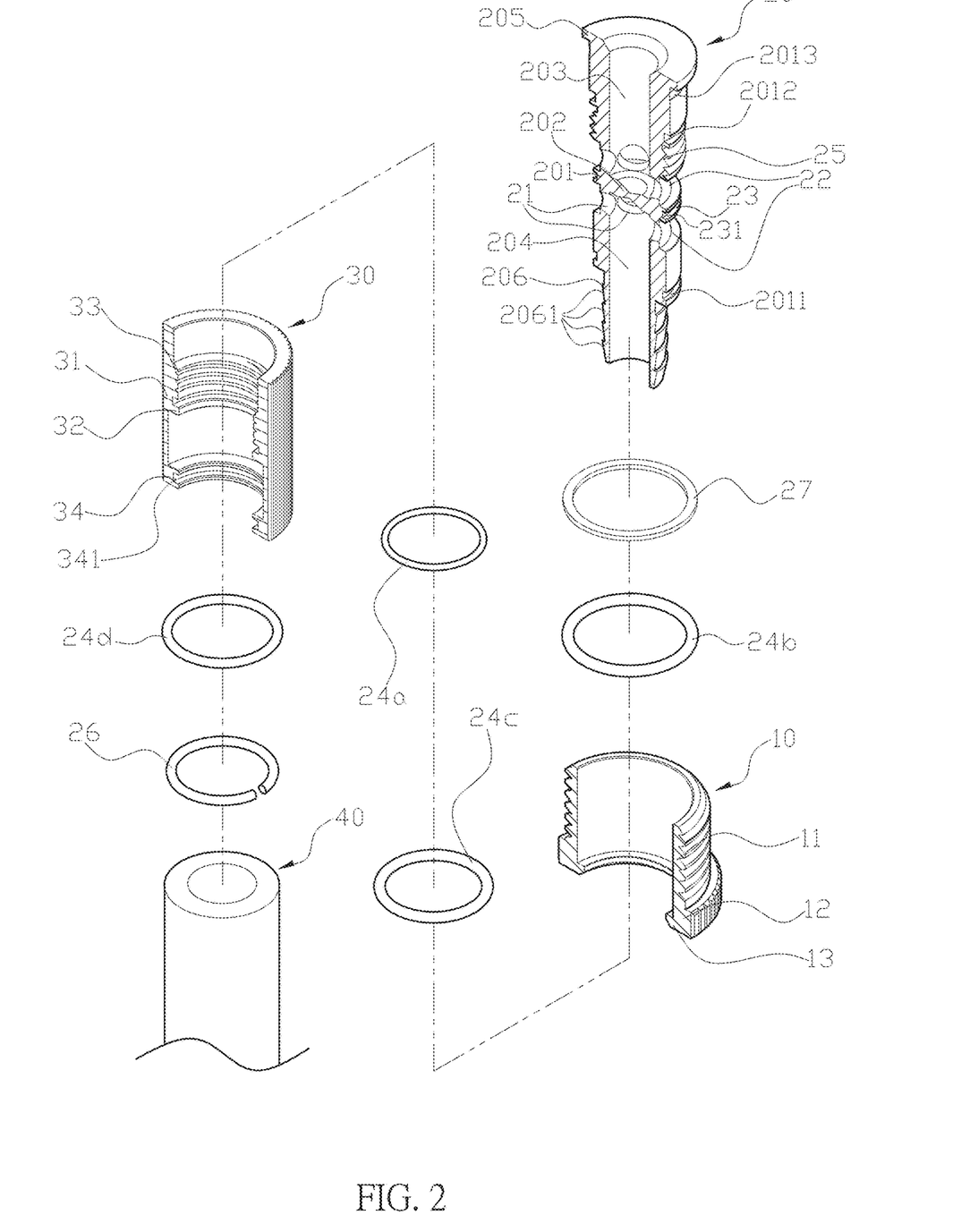
FIG. 2 is a three-dimensional exploded view of the preferred embodiment of the present invention.
Figure 3:
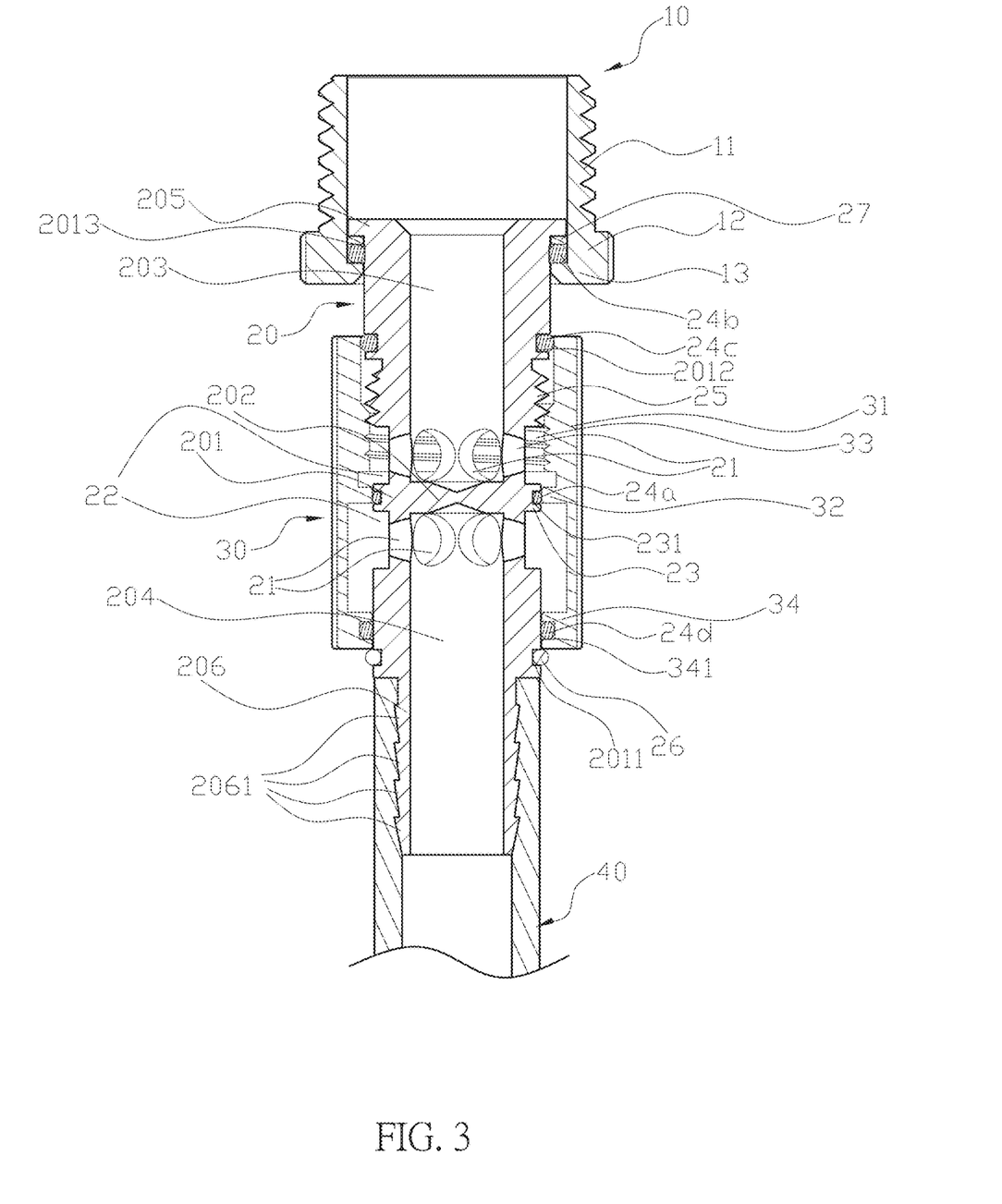
FIG. 3 is a cross-sectional view of the preferred embodiment of the present invention.
Figure 4:
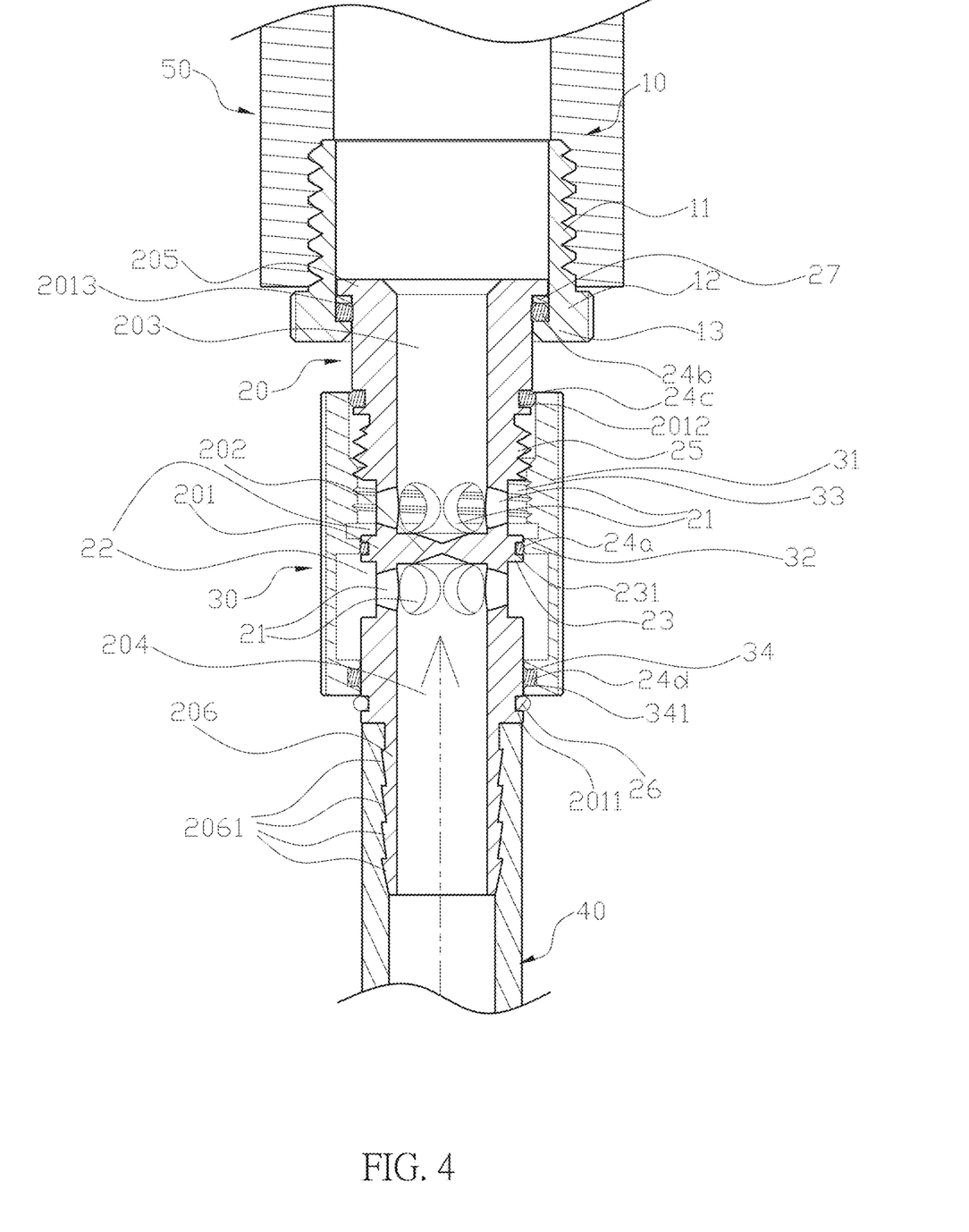
FIG. 4 is a cross-sectional view showing the water flow being turned off according to the preferred embodiment of the present invention.

First, please refer to FIG. 1 and FIG. 4. A flow control structure of a water hose joint comprises a hose connector 10, a coupler 20, a control section 30, and a hose 40. The hose connector 10 has a hollow main body 11, the main body 11 having a flange 12 at a lower opening, and the flange 12 has an inner lip 13 at a free end. The coupler 20 has a main portion 201 with a first groove 2011 and a second groove 2012. The main portion 201 has a blocking portion 202 blocking a first channel 203 and a second channel 204, which are divided by the blocking portion 202. The first channel 203 and the second channel 204 respectively have a plurality of through apertures 21.

The main portion 201 further has two water channels 22 and a protruding band 23 between the two water channels 22, and the protruding band 23 has a limiting groove 231 groove for accepting a sealing ring 24a. The main portion 201 further has an engaging portion 25 above the protruding band 23, a stopping edge 205 at a top end, and a fastening portion 206 at a bottom end.

The control section 30 has a hollow main member 31 with a limiting rim 32 and an adjusting portion 33, the main member 31 having a resisting portion 34 at a bottom opening, and the resisting portion 34 has a third groove 341.

The hose connector 10 is configured for being sleeved onto the coupler 20. A sealing ring 24b is disposed between the stopping edge 205 and the inner lip 13, and the coupler 20 pushes against the inner lip 13 of the hose connector 10 with the stopping edge 205 and the sealing ring 24b.

The adjusting portion 33 of the control section 30, and the engaging portion 25 of the coupler 20 threadedly engage each other to combine the control section 30 with the coupler 20. The second groove 2012 and the third groove 341 respectively have a sealing ring 24c and 24d for sealing the control section 30, and the fastening portion 206 of the coupler 20 is inserted into a hose 40. Furthermore, a C ring 26 is mounted at the first groove 2011 and abuts against the resisting portion 34 to limit movement of the control section 30 and prevent the adjusting portion 33 from escaping from the engaging portion 25.

As shown in FIG. 4, when the hose connector 10 is connected with a connecting pipe 50, by rotating the control section 30 to adjust the relative position of the control section 30 and the coupler 20, the sealing ring 24a in the limiting groove 231 abuts against the limiting rim 32, which is the "water turned-off" state. In the "water turned-off" state, the water flows from the hose 40 into the second channel 204 of the coupler 20 but is stopped by the blocking portion 202, so the water enters the through apertures 21 and the water channel 22 and flows into the control section 30, but is stopped again by the sealing ring 24a in the limiting groove 231 and the limiting rim 32.

Figure 5:
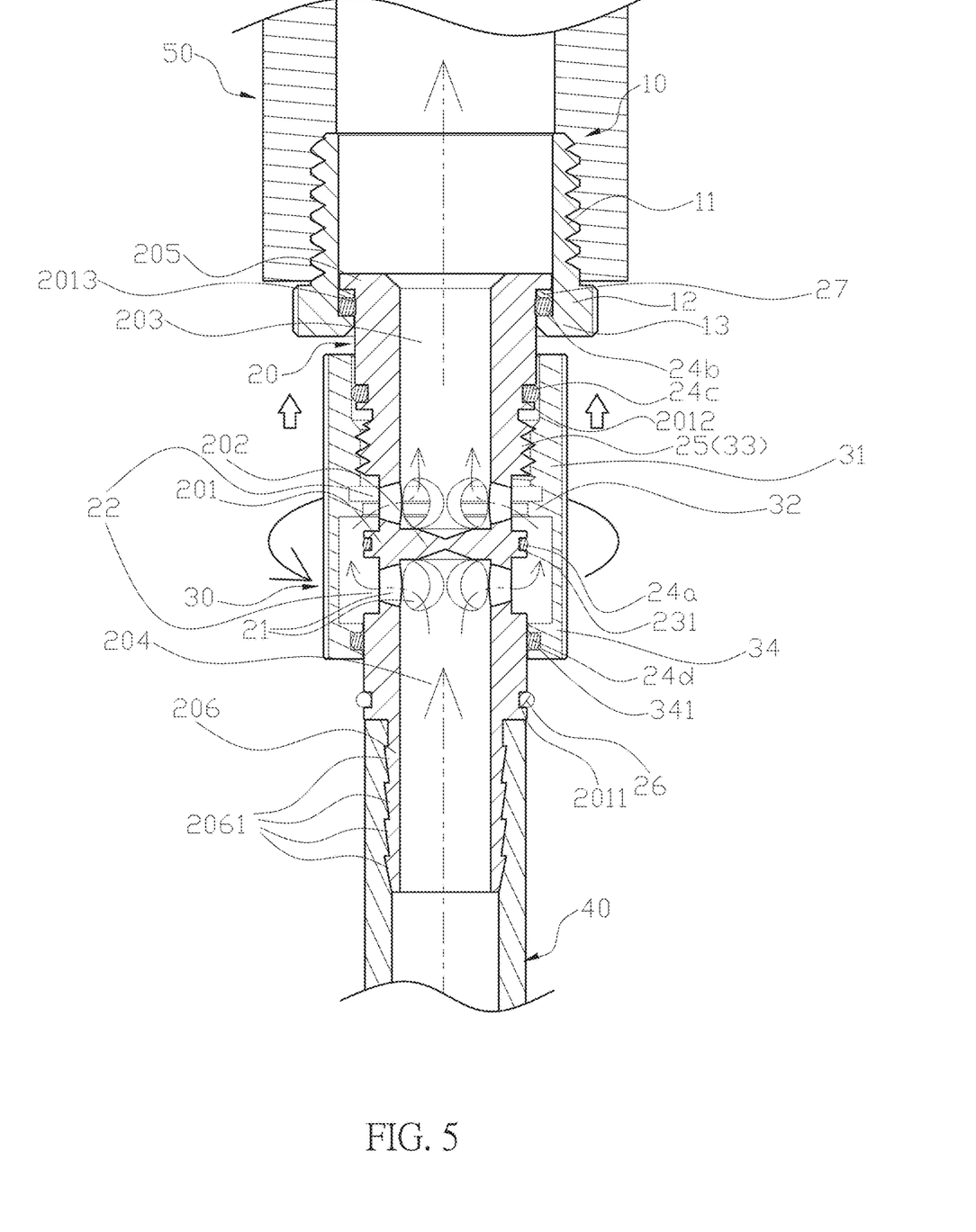
FIG. 5 is a cross-sectional view showing the water flow being turned on according to the preferred embodiment of the present invention.

As shown in FIG. 5, by rotating the control section 30 to adjust the relative position of the control section 30 and the coupler 20, the sealing ring 24a in the limiting groove 231 no longer abuts against the limiting rim 32, which is the "water turned-on" state. In the "water turned-on" state, the water flows from the hose 40 into the second channel 204 of the coupler 20 but is stopped by the blocking portion 202, and then passes through the through apertures 21, the water channel 22, and then flows into the control section 30, and because there is no blocking of the sealing ring 24a and the limiting rim 32 in the limiting groove 231, the water can flow into through the water channel 22, the through apertures 21, the first channel 203 of the coupler 20 and then enters the connection pipe 50 through the hose connector 10.

Figure 6:
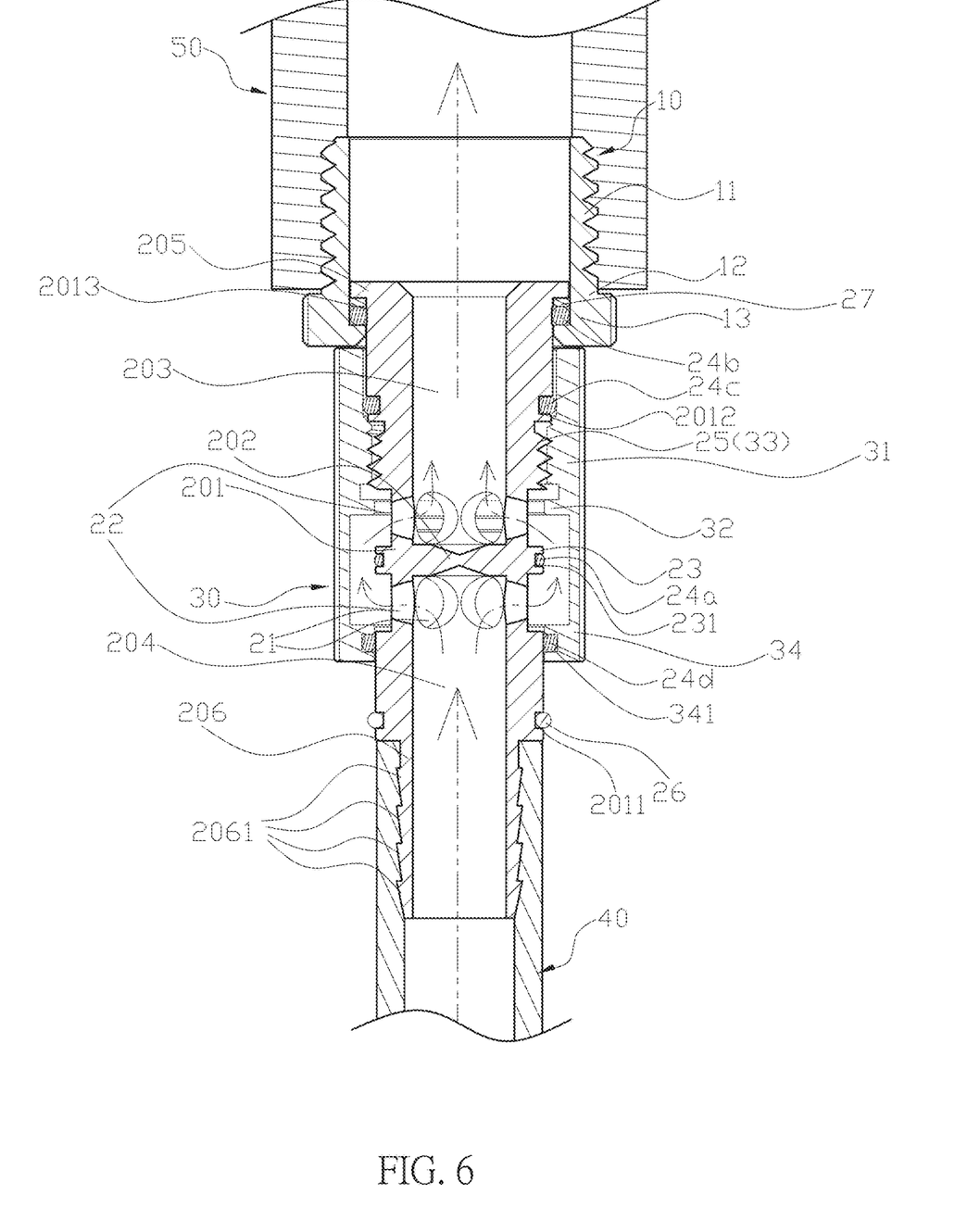
FIG. 6 is a cross-sectional view showing the state of full water flow according to the preferred embodiment of the present invention.

From the view shown in FIG. 6, by rotating the control section 30 to adjust the relative position of the control section 30 and the coupler 20 to push the control section 30 against the hose connector 10, the water flux is fully open and maximizes water flow.

Furthermore, the engaging portion 25 of the coupler 20 is an outer thread, and the adjusting portion 33 of the control section 30 is an inner thread corresponding to the outer thread.

Moreover, the fastening portion 206 has a plurality of inverted teeth 2061 for combining the fastening portion 206 and the hose 40.

As shown in FIG. 1, the outer side of the inner lip 13 of the hose connector 10 has a plurality of vertical stripes, which are increase contact surface area, making it easier for the user to rotate the hose connector 10 by hand.

Figure 7:
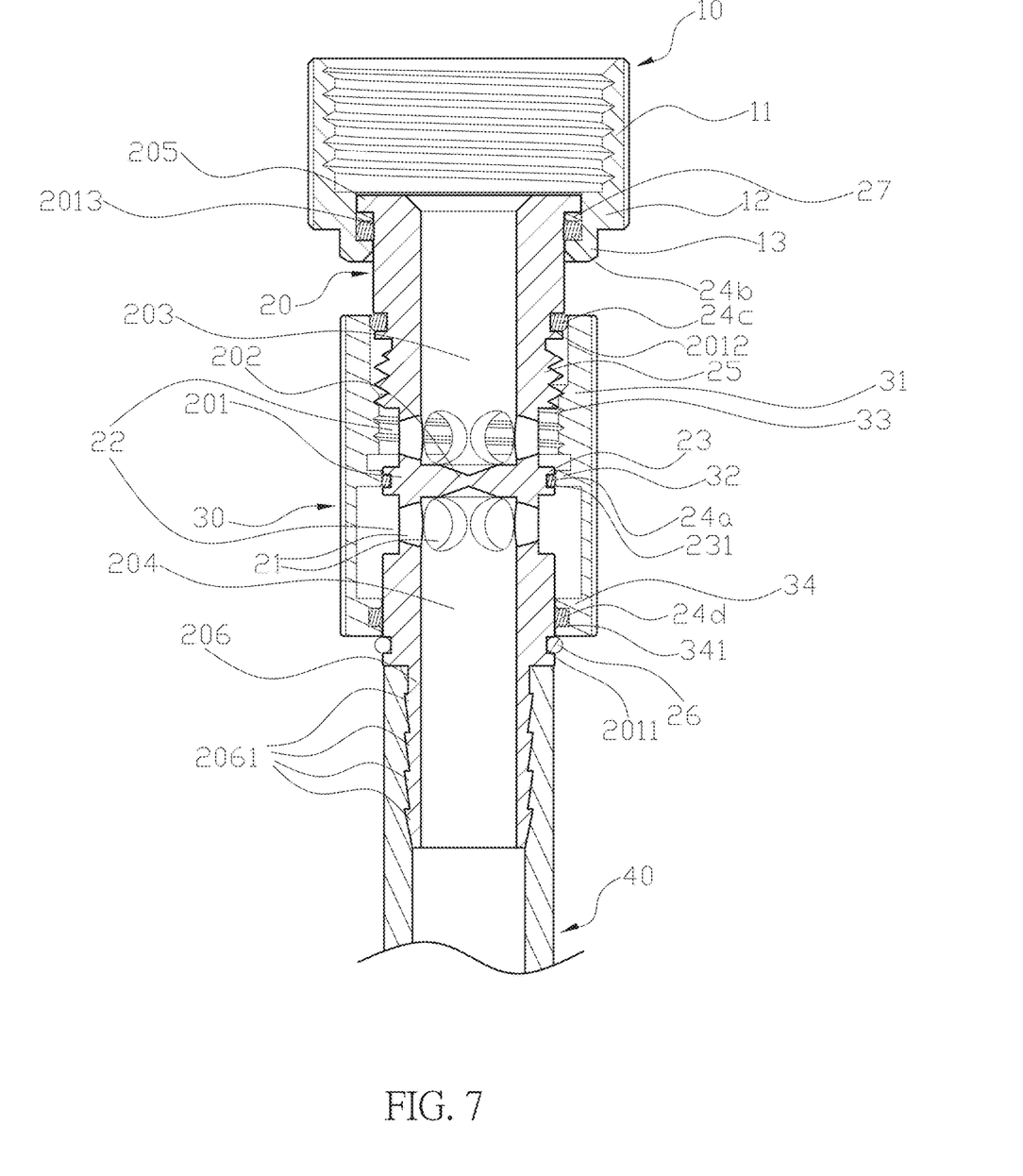
FIG. 7 is a sectional view of another embodiment of the present invention.

As shown in FIG. 7, the outer periphery of the hose connector 10 is provided with an internal thread corresponding to the connecting pipe 50.

Also, the main portion 201 is provided with a positioning groove 2013, and a sealing ring 24b is capable of being engaged with the positioning groove 2013, which has the effect of assisting the positioning of the sealing ring 24b.

Additionally, a smooth flat ring 27 is provided between the stopping edge 205 and the sealing ring 24b, and the coupling relationship between the coupler 20 and the hose connector 10 is a loose fit so that when the hose connector 10 rotates, it does not drive the coupler 20 to rotate, and it has the function of preventing the hose 40 from being entangled and knotted.

Furthermore, the flat ring 27 is made of plastic, metal, or Teflon®, which has the effect of resisting friction.

With the above structure, the following benefits can be obtained: First, the water flow can be adjusted by rotating the control section 30, which is easier and faster to adjust the flow. Second, the structure is located at the joint, so it is very close to the spraying tools used, no matter how far the user is from the water source, and so there is no need to go back to the faucet to adjust the water flow.

Although the present invention has been explained in relation to its preferred embodiment, it is to be understood that many other possible modifications and variations can be made without departing from the spirit and scope of invention as hereinafter claimed.

What is claimed is:

1. A flow control structure comprising: a hose connector, a coupler, and a control section, wherein:
the hose connector has a hollow main body with a flange at a lower opening, and the flange has an inner lip at a free end;
the coupler has a main portion with a first groove and a second groove;
the main portion comprises a blocking portion, a first channel, and a second channel, the first channel and the second channel divided by the blocking portion, the first channel and the second channel respectively having at least a through aperture;
the main portion further comprises two water channels and a protruding band between the two water channels, the protruding band having a limiting groove for accepting a first sealing ring;
the main portion further comprises an engaging portion above the protruding band, a stopping edge at a top end, and a fastening portion at a bottom end;
the control section has a hollow main member with a limiting rim and an adjusting portion, the main member comprising a resisting portion at a bottom opening, and the resisting portion has a third groove;
the hose connector is configured for being sleeved onto the coupler;
a second sealing ring is disposed between the stopping edge and the inner lip, the coupler pushing against the inner lip of the hose connector with the stopping edge and the second sealing ring, and the adjusting portion of the control section is threadedly engaged with the engaging portion of the coupler to combine the control section with the coupler;
the second groove and the third groove respectively have a third sealing ring and a fourth sealing ring engaging portion, the fastening portion of the coupler is insertable into a hose, and a C ring is mounted at the first groove and abuts against the resisting portion to limit movement of the control section and prevents the adjusting portion from escaping from the engaging portion.

2. The flow control structure as claimed in claim 1, wherein the engaging portion of the coupler is an outer thread, and the adjusting portion of the control section is an inner thread corresponding to the outer thread.

3. The flow control structure as claimed in claim 1, wherein the fastening portion has a plurality of inverted teeth.

4. The flow control structure as claimed in claim 1, wherein the outer side of the inner lip of the hose connector has a plurality of vertical stripes.

5. The flow control structure as claimed in claim 1, wherein the main member has a plurality of vertical stripes.

6. The flow control structure as claimed in claim 1, wherein an outer periphery of the hose connector is provided with an external thread corresponding to a connecting pipe.

7. The flow control structure as claimed in claim 1, wherein the main portion is provided with a positioning groove, and the second sealing ring is capable of being engaged with the positioning groove.

8. The flow control structure as claimed in claim 1, wherein a smooth flat ring is provided between the stopping edge and the second sealing ring, and the coupling relationship between the coupler and the hose connector is a loose fit.

9. The flow control structure as claimed in claim 8, wherein the flat ring is made of plastic.

10. The flow control structure as claimed in claim 8, wherein the flat ring is made of metal.

11. The flow control structure as claimed in claim 8, wherein the flat ring is made of polytetrafluoroethylene.

* * * * *